United States Patent [19]

Yu

[11] Patent Number: 6,084,540
[45] Date of Patent: Jul. 4, 2000

[54] DETERMINATION OF JAMMER DIRECTIONS USING MULTIPLE ANTENNA BEAM PATTERNS

[75] Inventor: Kai-Bor Yu, Niskayuna, N.Y.

[73] Assignee: Lockheed Martin Corp., Syracuse, N.Y.

[21] Appl. No.: 09/122,206

[22] Filed: Jul. 20, 1998

[51] Int. Cl.[7] .................. G01S 7/36; G01S 5/02; H04B 7/185

[52] U.S. Cl. .................. 342/17; 342/13; 342/16; 342/147; 342/175; 342/195; 342/357.01; 342/378; 342/379

[58] Field of Search .................. 342/13–19, 147, 342/175, 195, 378–385, 417, 428, 357.01

[56] References Cited

U.S. PATENT DOCUMENTS 5,101,209  3/1992  Martin ........................... 342/17 X
5,940,033  8/1999  Locher et al. ................... 342/378

Primary Examiner—Bernarr E. Gregory
Attorney, Agent, or Firm—W. H. Meise

[57] ABSTRACT

A radar or GPS receiving system uses an antenna array to produce multiple antenna beams directed toward multiple targets or spacecraft. Stand-off jammers produce signals which tend to be received on the sidelobes of the antenna beams and to disrupt system operation. An array of autonomous or adaptive nullers process the received signals to produce weights which adjust the antenna nulls to direct them toward the jammers. The antenna nulls of one beam pattern are compared with the nulls of other beam patterns. Normal between-sidelobe nulls will not occur at the same angle on all of the patterns, but those nulls generated by the nullers will occur at the same angle. The directions to the jammers are deemed to be those directions in which all beam patterns have nulls.

3 Claims, 8 Drawing Sheets

DETERMINATION OF JAMMER DIRECTIONS USING MULTIPLE ANTENNA BEAM PATTERNS

FIELD OF THE INVENTION

This invention relates to radar and global positioning system arrangements, and more specifically to such arrangements in which jammer signals are nulled by autonomous nulling systems, and the direction(s) of the jammer(s) is(are) determined by the overlap of nulls.

BACKGROUND OF THE INVENTION

Countermeasures have been used almost since the inception of radar for lessening the effectiveness of target detection. Early countermeasures included chaff, which consisted of strips of conductive metal foil dropped in an area, to simulate a target. The jamming technique relies on use of an active transmitter which transmits a signal which overwhelms the radar receiver, or which deceives the radar system processing into perceiving targets at locations at which they do not exist. A traditional way for the radar operator to overcome jamming is to adjust his antenna so that a less responsive portion of the antenna beam pattern, or preferably a null is directed toward the jammer. When a beam null is directed toward the jammer, the jammer signal at the receiver is minimized, and the jammer may be rendered ineffective. With simple antennas, it is difficult to generate plural nulls which would make it possible to reject the signals from a number of simultaneously operating jammers.

With the advent of modern array antenna techniques, it became possible to generate multiple antenna beams simultaneously or in a short time sequence. This gave rise to the ability to track multiple targets either simultaneously or quasi-simultaneously, using computer-controlled antenna beam controllers and signal processing. Computer control also gave rise to autonomous jammer nulling techniques, in which the array antenna could be controlled by an autonomous system dedicated to the reduction of the jamming signal from a single jammer, without excessively deforming the main or target detection beam. U. S. Pat. No. 5,600,326, issued Feb. 4, 1997 in the name of Yu et al. describes one such jammer nulling technique. Other techniques include those described by S. P. Applebaum in the article "Adaptive Arrays," IEEE Transactions on Antennas and Propagation, vol. AP-24, No.5, September 1976, pp 585–598, and in an article by Widrow et al. entitled "Adaptive Antenna Systems," Proceedings of the IEEE, vol 55, December 1967, pp 2143–2159. With such autonomous jamming reduction capability, the radar system operation is essentially freed from the need to devote radar processing resources to jammer signal reduction.

Improved methods and arrangements are desired for determining the direction of a jammer.

SUMMARY OF THE INVENTION

A radar system according to the invention includes at least one array antenna, for generating multiple directive beams. These multiple directive beams may be generated simultaneously, or they may be generated sequentially, so long as generated during an interval in which a jammer signal is present at a fixed location; that is to say, that it doesn't matter if the beams are formed simultaneously or sequentially, so long as the jammer doesn't become inactive or move its location between beams. Each of the directive beams is associated with sidelobe nulls, as is well known to those skilled in the art. The radar system includes a transmitting and receiving arrangement coupled to the (at least one) array antenna. The transmitting arrangement generates radar transmission signals for transmission toward targets, and the receiving arrangement receives reflected signals over at least some of the directive beams from targets. The radar system also includes a radar signal processing arrangement coupled to the transmitting and receiving arrangement, for processing information relating to the transmission and reflected signals, for generating display information relating to the targets, all as known in the radar arts. The radar system also includes a plurality (at least two, and preferably more) of adaptive jammer nulling arrangements coupled to the receiving arrangement and to control the array antenna. Each of the jammer nulling arrangements adjusts the antenna beam patterns of the array antenna in a manner which produces a beam null directed toward the associated jammer, for thereby reducing the effect of operation of the jammer on the radar system. Since there are a plurality of such jammer nulling arrangements, there are a plurality of antenna beam pattern nulls, one directed toward each jammer, and these nulls remain in the same direction (location in angular coordinates) regardless of the direction in which the main beam is pointed. A jammer direction determination arrangement is coupled to the jammer nulling arrangement, for comparing the directions of the nulls in each of the antenna beams, including those produced by each of the jammer nulling arrangements. The nulls produced by the jammer nulling arrangements will occur in each beam, while other antenna beam nulls will, in general, not occur in all of the beams. The directions in which nulls occur in all of the antenna beam patterns are deemed to be the directions of the jammers.

A method, according to an aspect or mode of the invention, for detecting the location or locations of target(s), and the directions of jammers when present, includes the step of transmitting radar transmission signals toward a target, which transmission may be by any convenient means. Reflected signals are received from at least one of the targets by way of (or by means of) a controllable array antenna. The directive pattern of the controllable array antenna is controlled in such a manner as to generate at least one main lobe for each directive pattern, and more than one main lobe may be generated in any one directive pattern. The received signals are processed to identify the presence of a target, and or to determine its location. In the presence of jamming signals, the received signals are processed in such a manner as to produce signals for modifying the directive pattern to direct a directivity null of the directive pattern toward the source of the jamming signals. The step of producing signals for modifying may be accomplished by an autonomous or automatic nulling arrangement. According to an aspect of the invention, a plurality of the directive patterns are compared with each other, for determining those (three-dimensional) angular directions from which the jamming signals arrive at the antenna. The location of the jammer or source of jamming signals is deemed to be that direction in which a null occurs for all (each and every one) of the plurality of directivity patterns. The directivity patterns, if produced sequentially rather than simultaneously, may require delays in the processing, so that their characteristics can be compared.

Another embodiment of the invention lies in a global positioning system (GPS) receiver. The GPS receiver includes at least one array antenna, for generating antenna beam patterns. As in the case of the radar antenna system, the beam patterns may be simultaneous or sequential, so long as the sequential beams include multiple directive beams during an interval in which a jammer signal is present at a fixed location. Each of the directive beams is associated with sidelobe nulls. The GPS receiver includes a receiving and control arrangement coupled to the (at least one) array antenna, for directing the beams toward global positioning satellites, and for receiving global positioning signals from the global positioning satellites. A signal processing arrangement is coupled to at least the receiving portion of the receiving and control arrangement, for processing information relating to the global positioning signals, and for generating display information relating to the position of the global positioning receiver, all as known in the art. A plurality of adaptive jammer nulling arrangements is coupled to the receiving and control arrangement, for adjusting the antenna beam patterns of the array antenna in a manner which produces a beam null directed toward each jammer in each of the patterns, for thereby reducing the effect of operation of the jammer on the global positioning receiver. The GPS receiver also includes a jammer direction determination arrangement coupled to the jammer nulling arrangements, for comparing the directions of the nulls in each of the antenna patterns, including those nulls produced by the jammer nulling arrangements. Those directions in which nulls occur in all of the antenna patterns are deemed to be the directions of the jammers. Naturally, while the system as described can determine the directions of multiple jammers, if only one jammer is present, only one direction will be identified.

DESCRIPTION OF THE INVENTION

Figure 1:
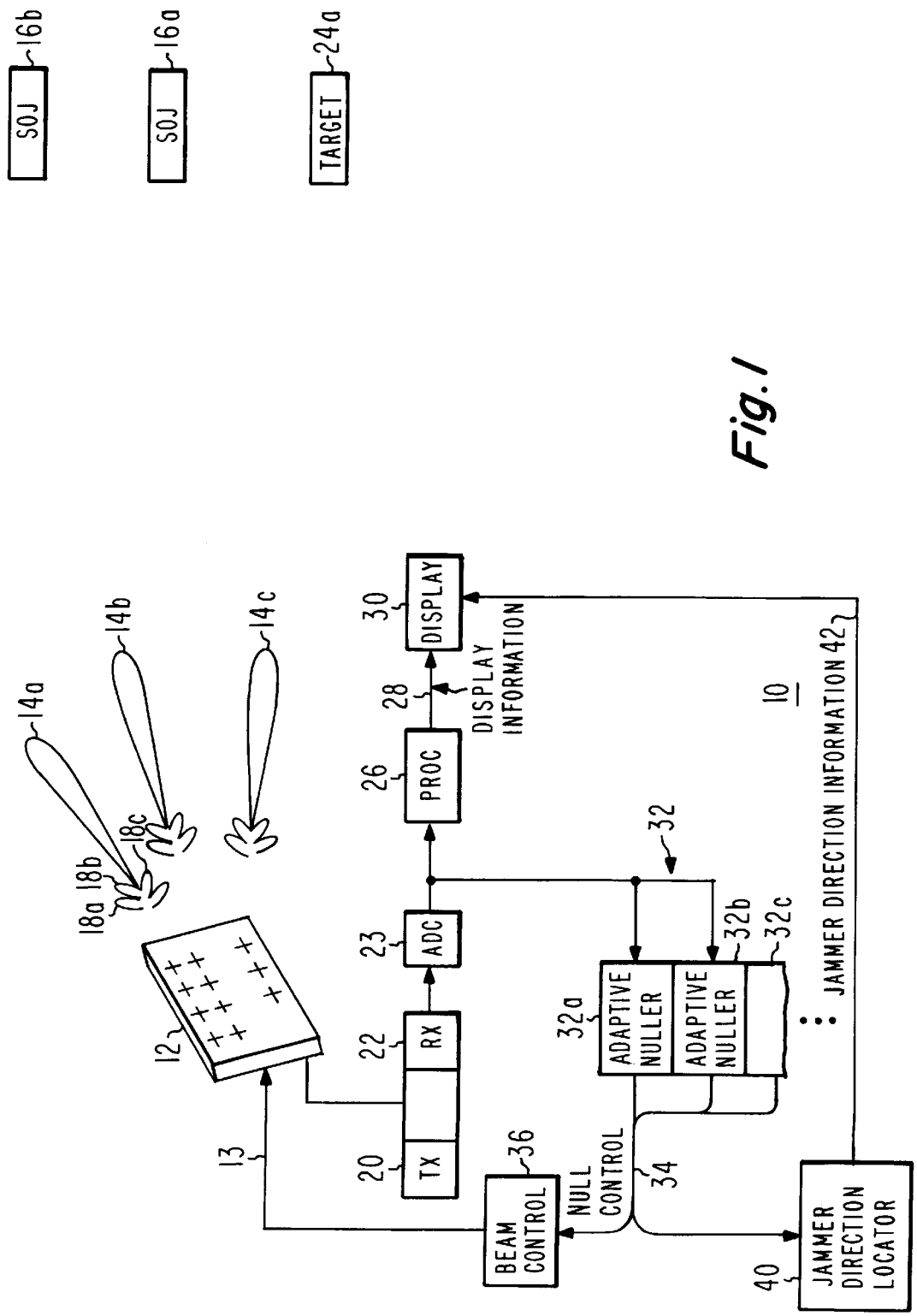
FIG. 1 is a highly simplified or conceptual representation of a radar system according to an aspect of the invention.

In FIG. 1, a radar system designated generally as 10 includes an array antenna 12. Array antenna 12 receives antenna beam pattern control signals over a signal path 13, for controlling the beam pattern. Those skilled in the art know that the beam pattern of an array antenna can be controlled to produce one or more directive beams, which may be broad, or of the "pencil" type. Since control of an array antenna does not involve moving any physical object, control of the beam direction can take place almost instantaneously. Consequently, multitudes of directional beams can be generated in sequence in a very short period of time. As an alternative, the antenna beam controls can be adjusted to simultaneously produce multiple directional beams. In FIG. 1, three representative beam patterns 14a, 14b, and 14c are illustrated, which point in different directions from the antenna, as might be desirable when tracking multiple radar targets. The directional patterns 14a, 14b, and 14c each include a plurality of sidelobes, designated 18a, 18b, and 18c. Each sidelobe is separated from the adjacent sidelobe, and from any adjacent main lobe, by a null in the antenna or beam pattern.

A transmitter or transmitting system 20 is part of the radar system 10 illustrated in FIG. 1. Transmitting system 20 produces radar signals for transmission by the antenna 12 toward the region to be searched for targets. A single target 24a is illustrated in FIG. 1, but there may be many targets. When the transmitted signal is radiated by the antenna 122 by way of either beam pattern 14a or 14b, little signal falls onto target 24a, and little reflected energy returns to the antenna. On the other hand, when the transmitted radar signal is radiated by antenna 12 over antenna pattern 14c, more of the signal reaches a target, such as target 24a, and portion of the transmitted signal is reflected, and returns toward the array antenna 12. Array antenna 12 receives the reflected signal, over beam pattern 14c, and couples the signal to a receiving arrangement (RX) 22, which performs analog signal processing such as low-noise amplification, frequency conversion, or the like. The received signal is converted into digital form as early in the process as convenient, in this case in an analog-to-digital converter (ADC) 23. The digital signals are applied to a conventional radar signal processor 26, where the target(s) are identified and their locations determined. Information relating to the targets is transferred over a signal path 28 to a display device 30.

FIG. 1 also illustrates a set 16 of standoff jammers (SOJ) 16a, 16b, . . . . These jammers, as known, may be mounted on aircraft which fly in circular or "racetrack" paths at a distance from the radar system, transmitting signals intended to spoof the radar system or render it inoperative, at least in the direction of the jammer. When an antenna beam pattern is generated with a peak pointed in a particular direction, either the peak response portion (the "main beam") or one of the sidelobes is likely to be directed toward one of the jammers. The jammers produce sufficient transmitted power to, they hope, disrupt operation of the radar system even if the jamming signals enter the radar system 10 by way of a sidelobe of set 18a, 18b, . . . .

According to an aspect of the invention, a set of adaptive nullers 32 including a plurality of adaptive nullers or antenna controllers 32a, 32b, . . . receives the digital signals from ADC 23, and performs adaptive nulling on the current (present-time) antenna beam pattern, to create a null in the beam pattern in the direction of an associated one of the jammers of set 16. Such adaptive nullers are known per se, and operate on the received signals to produce weight information which can be used by a beam controller 36 to adjust the generation of the beam pattern to include a null at the location of the jammer. Adaptive nuller 32a produces weights which cause the currently generated antenna beam pattern 14a to have or display a null in the direction of jammer 16a, adaptive nuller 32b produces weights which cause the currently generated antenna beam pattern 14a to have or display a null in the direction of jammer 16b, and so forth. Regardless of the number of main beams or lobes which are generated by the antenna in the currently generated beam pattern, there may be several nulls in that beam pattern, one corresponding to the direction of each jammer.

It should be understood that the null directions are established in three dimensions relative to the antenna 12. While the jammers are always considered to be on (or at least very near) the "horizon," the location of the horizon relative to the vehicle can change with changes in the orientation of the vehicle on which the antenna is mounted.

Figure 2:
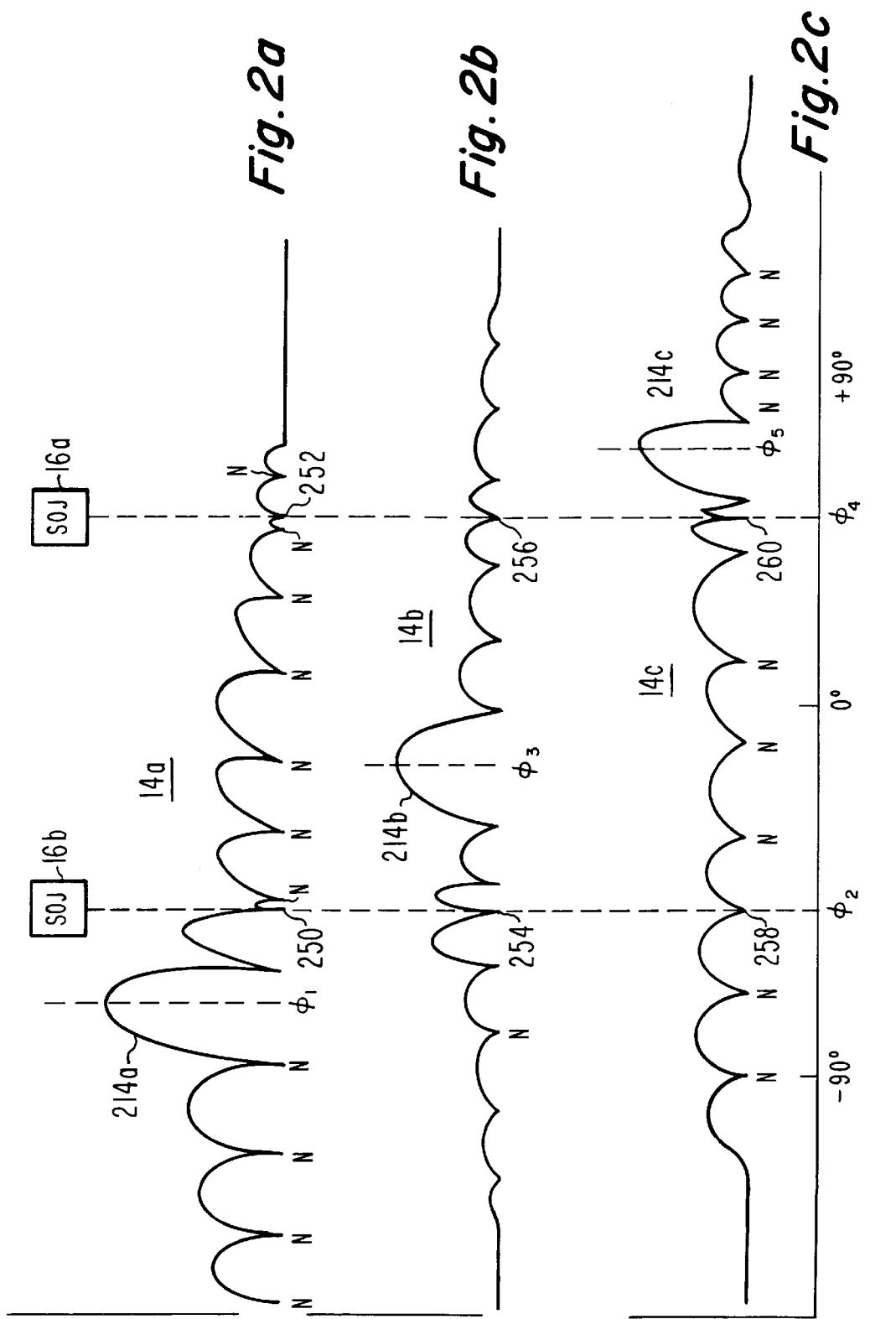
FIGS. 2a, 2b, and 2c are simplified representations of antenna beam patterns, each including a main lobe, and each including a null at each jammer location.

FIG. 2a is a two-dimensional representation of antenna beam pattern 14a of FIG. 1, including its main lobe 214a centered at angle $\phi_1$, sidelobes designated 18a with nulls N lying between the sidelobes, and with additional jammer-removing nulls 250 and 252, generated by set 32 of adaptive nullers, lying at angles $\phi_2$ and $\phi_4$. In this context, two-dimensional means that antenna beam relative amplitude is plotted against angle, which may be either azimuthal angle or zenith/elevation angle. The zenith angle is measured from the zenith, the elevation angle is measured from the horizon. FIG. 2b is a representation of antenna beam pattern 14b of FIG. 1, including its main lobe 214b centered at azimuthal angle $\phi_3$, sidelobes designated 18b with nulls lying between the sidelobes, and with additional jammer-removing nulls 254 and 256, generated by set 32 of adaptive nullers, lying at angles $\phi_2$ and $\phi_4$, and FIG. 2c is a representation of antenna beam pattern 14c of FIG. 1, including its main lobe 214c centered at angle $\phi_5$, sidelobes designated 18c with nulls lying between the sidelobes, and with additional jammer-removing nulls 258 and 260, generated by set 32 of adaptive nullers, lying at angles $\phi_2$ and$\phi$4. As mentioned, the beam patterns illustrated in FIGS. 2a, 2b, and 2c may coexist (occur simultaneously) or may occur sequentially in time.

The terminology used in defining antenna elements and characteristics is old, and was adopted at a time at which the level of understanding of antennas was less advanced than the current understanding. Consequently, there are some terms which are used in antenna practice which are capable of being misunderstood. Among these is the term "radiation pattern." Those skilled in the art know that antennas are reciprocal transducers, which transduce between guided waves in transmission lines and unguided or free-space radiation. Being reciprocal, the relative received radiation or transmitted radiation from an antenna (that is, the "radiation pattern") is identical for both transmission and reception, but the term "radiation" pattern is used, regardless of whether transmission or reception is meant. Another term which may be misunderstood is the term "antenna feed" which is now understood to mean not only the antenna terminal(s) to which signal to be radiated is applied, but also refers to the antenna terminal or terminals at which the received signal is taken from the antenna in a receiving mode of operation.

Since the adaptive beam nullers operate autonomously, there is no control bus which can be examined to determine the expressed direction or location of the associated jammer. It might be possible to perform an analysis of the output signals, but since these are couched in terms of antenna pattern weights, they are not amenable to simple evaluation. Furthermore, since there may be many such nullers in operation at any one time, to take care of the effects of a plurality of potential jamming sources, any analysis of the direction indicated by the weights produced by any one nuller would have to be compensated for the effects of the other weights, an altogether intractable analytic situation.

According to an aspect of the invention, additional information exists in the signals as a result of the operation of the nullers. This additional information is the locations of those nulls which occur at the same angle in all of the antenna patterns. This is readily understood by recourse to FIGS. 2a, 2b, and 2c. The locations of the jammers in the illustrated two-dimensional space is simply those locations at which the antenna beam pattern nulls occur in all three of the patterns 14a, 14b, and 14c. In general, the more such antenna beam patterns exist, the less likely it is that naturally occurring sidelobe nulls N will overlap, or occur at the same angle, on all the patterns. Thus, nulls occur at angles $\phi_2$ and $\phi_4$ in all of FIGS. 2a, 2b, and 2c, corresponding to the angular locations or directions of the jammers 16b and 16a, respectively. The likelihood of angular coincidence or overlap of natural nulls N decreases with increasing number of such patterns under evaluation.

The invention as thus far described is easy to understand. It is clear that signal processing is needed to identify those locations which correspond with nulls in all of the antenna patterns in question. If the antenna patterns are not generated simultaneously, but rather are generated sequentially, some form of delay must be provided in order to bring the antenna pattern information into time correspondence, to allow the processing to make the requisite comparisons.

Figure 3:
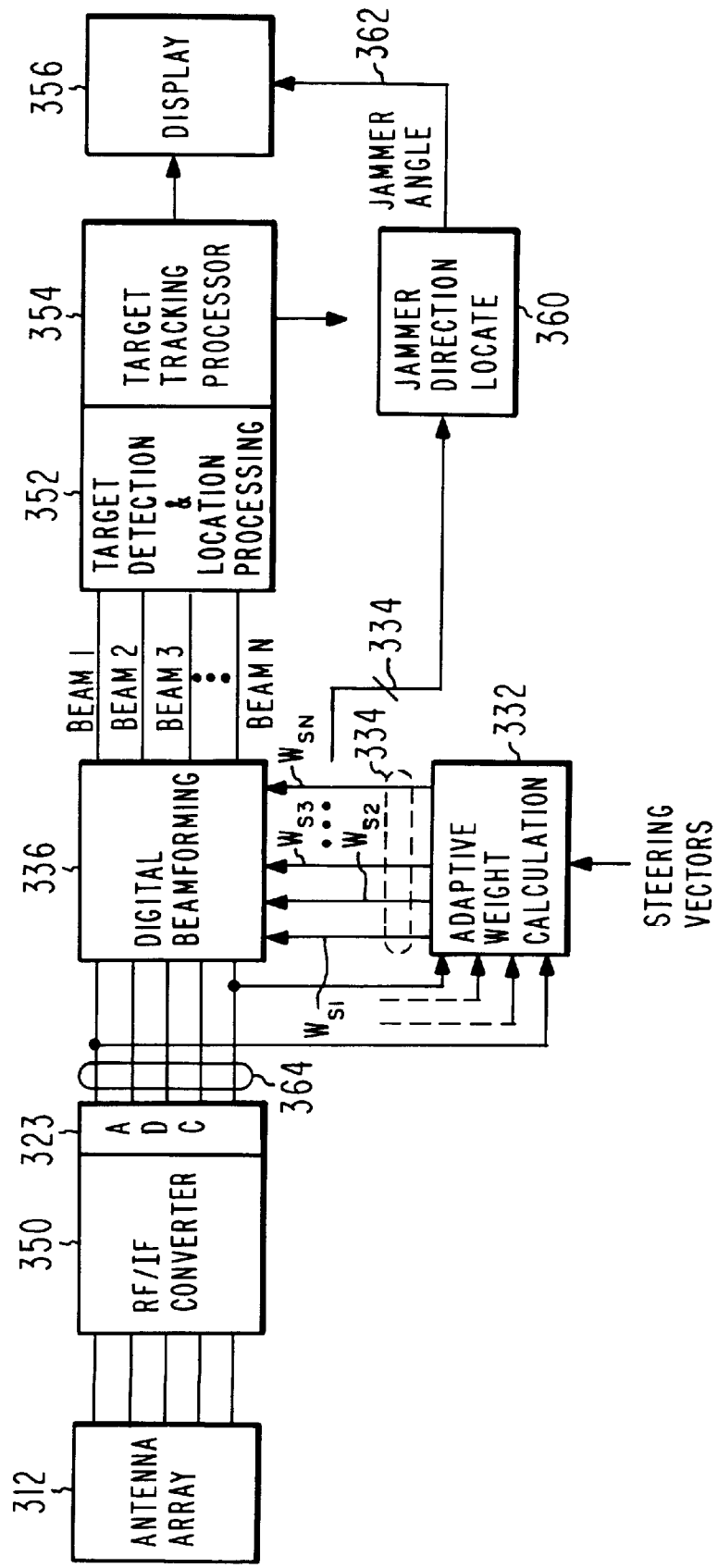
FIG. 3 is a simplified, somewhat different representation of the radar system of FIG. 1.

As mentioned, FIG. 1 is highly simplified. When digital signal processing is used in a radar context, the processing can conceptually be separated into functional blocks, but is otherwise merely a part of the overall processing. Thus, only a conceptual representation is meaningful. FIG. 3 is a simplified conceptual representation of a receive portion of a radar system corresponding to that of FIG. 1. In FIG. 3, elements corresponding to those of FIG. 1 are designated by like reference numerals, but in the 300 series. In FIG. 3, antenna array 312 is coupled to an RF downconverter arrangement 350, and an ADC 323 converts the downconverted analog signals for converting them into digital form. The digital signals are applied to a digital beamformer 336, which processes the signals to produce the desired beams, designated beam 1, beam 2, beam 3, . . . beam N. The signals representing the various beams are applied to a target detection and location processor 352 and to a target tracking processor 354. Target detection and location processor 354 performs conventional processing, for producing information signals, which may be transmitted to another location, further processed, or displayed by a display unit illustrated as 356.

Also in FIG. 3, adaptive weight calculation arrangement 332 receives the downconverted digital signals, and processes them to produce weight sets $W_{S1}$, $WS_{S2}$, $WS_{S3}$, . . . $W_{SN}$ for application by way of a data path 334 to the digital beamforming processor 336. According to an aspect of the invention, a jammer direction or location block is coupled by a branch of path 334 to receive the weight sets $W_{S1}$, $W_{S2}$, $W_{S3}$, . . . $W_{SN}$, for determining the directions of the jammers, and for generating information for application to a utilization device (not illustrated) or a display 356.

While the concept of the invention as described in conjunction with FIGS. 2a, 2b, and 2c is easy to understand, it lacks a certain rigor, because the antenna radiation or beam pattern, while well known, is not amenable to simple evaluation. For example, the nulls N of the plots of FIGS. 2a, 2b and 2c are only "visible" when there is signal being transduced at the angle of the null, and even then the presence of the null prevents or attenuates its reception. Those skilled in the art know that the antenna pattern can be described as the Fourier transform of the antenna weights, but even this type of determination can require substantial computational resources.

As described above, each of the weight sets $W_{S1}$, $W_{S2}$, $W_{S3}$, . . . $W_{SN}$ includes a plurality of weights, each of which is a scalar quantity. Each weight set completely defines the characteristics of a single radiation pattern. More specifically, weight set $W_{s1}$ completely defines radiation pattern 14a of FIG. 2a, weight set $W_{S2}$ completely defines radiation pattern 14b of FIG. 2b, and weight set $W_{S3}$ completely defines radiation pattern 14c of FIG. 2c. Other weight sets, up to and including last weight set $W_{SN}$, each completely describe one unique radiation pattern. The number of nulls in the radiation pattern equals one less than the number of antenna elements in the array; but it should be clearly understood that the number of nulls is in the three-dimensional radiation pattern, and a radiation pattern taken in any one plane, such as the radiation patterns of FIGS. 2a, 2b, and 2c, may not show all of the nulls which exist in the three-dimensional pattern. Any one radiation pattern is defined by the weights of the associated set of weights; each of the weights corresponds to the amplitude and phase response applied to any one element of the antenna array. Thus, there is one weight, representing amplitude and relative phase, for each element of the array, and the cumulation of those weights constitutes one set of weights which produce a single radiation pattern.

Equation 1 represents any one measurement of the antenna element, as found on signal path 364.

$$r_l(t) = \sum_{k=1}^{K} \exp\left(j\frac{2\pi}{\lambda}(T_x^k X_l + T_y^k Y_l)\right) a_k(t) + n_l(t) \qquad 1$$

In equation (1), $r_1(t)$ represents the $1^{th}$ antenna element signal level or voltage. Also in equation (1), k is an index representing one of the jammers, K represents the total number of jammers, $T_x$ and $T_y$ are the direction cosines, and the antenna element positions in the antenna array are designated $X_1$ and $Y_1$. $a_k(t)$ represents the amplitude of the $k^{th}$ jammer at time t, and $n_1(t)$ represents the thermal receiver noise of the $1^{th}$ antenna element at time t. Equation (2) represents the vector form of equation (1), where the underscore or underline is the notation for a vector.

$$\underline{r}(t) = \sum_{k=1}^{K} J_k a_k(t) + \underline{n}(t) \qquad 2$$

Figure 4:
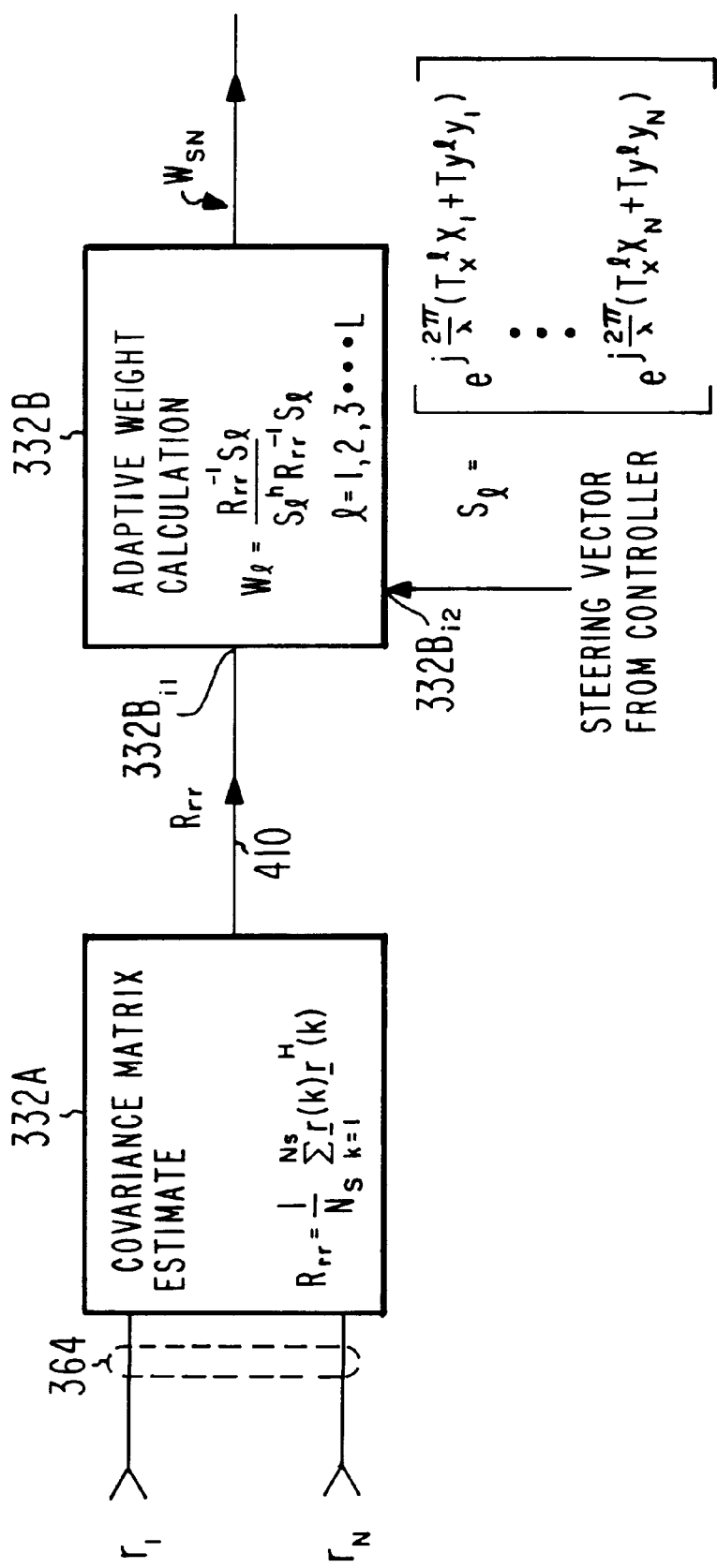
FIG. 4 is a simplified block diagram of a weight adaptation portion of the arrangement of FIG. 3.

FIG. 4 is a simplified block diagram of the adaptive weight calculation block 332 of FIG. 3. It should be emphasized that the representations of FIG. 4 represent merely one way to perform prior-art functions, which are described only to provide a proper basis for understanding the processing according to the invention. In FIG. 4, the digitized received signal from signal path 364 is applied to a block 332A, which performs the covariance matrix estimate $$R_{rr} = \frac{1}{N_s} \sum_{k=1}^{N_s} \underline{r}(k)\underline{r}^H(k) \qquad 3$$

where:

$R_{rr}$ is the covariance matrix for received (r) signal r;

$N_s$ is the total number of samples or measurements;

vector r is the measurement vector or signal; and

H represents the complex conjugate transpose.

The covariance matrix estimate for the current radiation pattern $R_{rr}$ is applied over a signal path 410 to an input port $332B_{i1}$ of block 332B, which also receives the antenna beam steering vector $S_1$, as set forth in equation 4, at an input port $332B_{i2}$.

$$J_k = \begin{bmatrix} 1 \\ e^{j\frac{2\pi}{\lambda}(T_x^l X_l + T_y^l Y_l)} \\ \vdots \\ e^{j2\frac{\pi}{\lambda}(T_x^l X_N + T_y^l Y_n)} \end{bmatrix} \qquad 4$$

Covariance matrix estimate block 332B of FIG. 4 performs the adaptive weight calculations in accordance with equation (5).

$$W_l = \frac{R_{rr}^{-1} S_l}{S_l^h R_{rr}^{-1} S_l} \qquad 5$$

where l=1, 2, 3, . . . L, where $S_l$ is the steering vector given by $$S_l = \begin{bmatrix} 1 \\ e^{j\frac{2\pi}{\lambda}(T_x^l X_1 + T_y^l Y_1)} \\ \vdots \\ e^{j\frac{2\pi}{\lambda}(T_x^l X_n + T_y^l Y_n)} \end{bmatrix}$$

The output $W_{SN}$ from block 332B of FIG. 4 is the value of $W_1$ for any one value of 1. Output signal path $W_{SN}$ of FIG. 4 corresponds to one signal path $W_{SN}$ of signal path set 334 of FIG. 3. The signals $W_{SN}$ on signal path $W_{SN}$ of FIG. 4 are coupled to digital beamforming block 336 and jammer direction location block 360 of FIG. 3.

Figure 5:
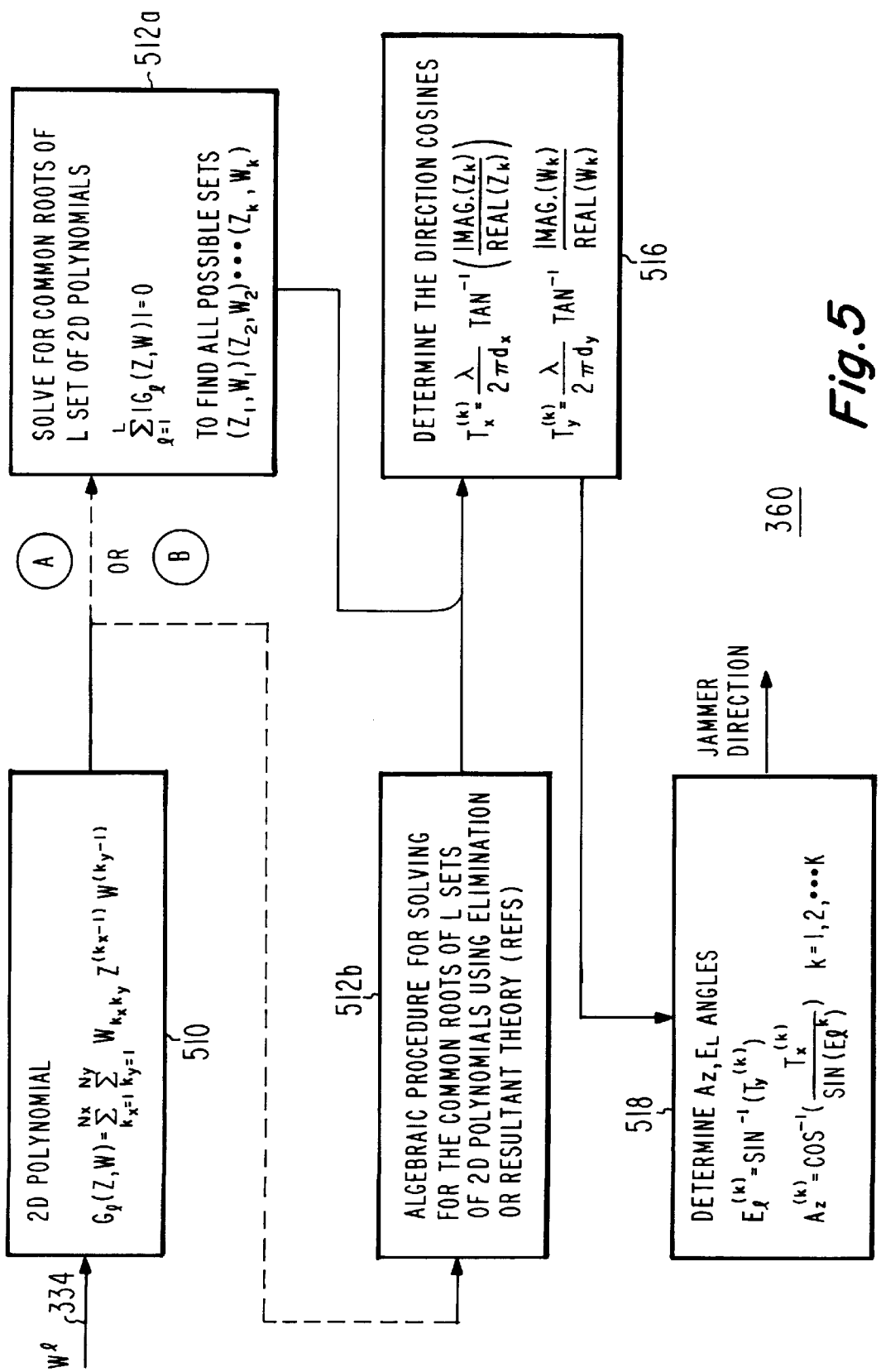
FIG. 5 is a simplified block diagram of a jammer direction determination block of the arrangement of FIG. 3.

When the set of adaptive weights have been determined according to equation (5), the jammer directions can be calculated. In general, this is accomplished by forming polynomials using the adaptive weights, and solving for the roots of the polynomials. The K common roots of the polynomials give the jammer directions. The block diagram of FIG. 5 is a simplified representation of the processing which is performed in jammer direction location block 360 of FIG. 3. In FIG. 5, the signal(s) representing the adapted antenna-pattern controlling weights, designated $W^1$, are applied over signal path 334 to a block 510, which represents generation of a two-dimensional polynomial as expressed by Equation (6)

$$G_l(Z, W) = \sum_{k_x=1}^{N_x} \sum_{k_y=1}^{N_y} W_{k_x k_y} Z^{(k_x-1)} W^{(k_y-1)} \qquad 6$$

where:

$G_l(Z, W)$ represents the two-dimensional polynomial corresponding to the antenna pattern;

$W_{K_x K_y}$ represents the adaptive nulling weight;

Z represents $e^{j(2\pi/\lambda)(TX \ dX)}$; and

W represents $e^{j(2\pi/\lambda)(TY \ dY)}$.

From block 510 of FIG. 5, the processing can take one of two alternative paths A or B, which couple the logic flow to one of two functional blocks designated 512A and 512B, either of which finds the roots of a system of L sets of two-dimensional polynomials, in a form such as that of equation (7).

$$(Z_1^l, W_1^l), (Z_2^l, W_2^l), \ldots (Z_k^l, W_k^l) \qquad 7$$

where:

$Z_1^1, Z_2^1 \ldots$ represent all the roots corresponding to the direction cosines along the azimuth direction; and $W_1^1, W_2^1, \ldots$ represent all the roots corresponding to the direction cosines along the elevation direction.

More particularly, block 512A represents solution for the common roots of L sets of two-dimensional polynomials by equation (8)

$$\sum_{l=1}^{L} |G_l(Z, W)| = 0 \qquad 8$$

for all possible sets of roots as set forth in equation (7).

If block 512B is used to solve for the common roots of the L sets of two-dimensional polynomials, the calculations are performed by a conventional algebraic procedure, such as by the use of elimination theory or resultant theory, as described, for example, in T. Y. Li, T. Sauer, and J. A. York, *The Cheater's homnotopy: An efficient procedure for solving systems of polynomial equations*, SIAM J. Numer. Anal., 26:1241–1251, 1989; B. L. Van Der Waerden, *Modern Algebra*, Vol I and II, Ungar, New York, 1953; or A. G. Kouchnirenko, *Polyèdres de newton et nombres de milnor*, Invent. Math., pages 1–31, 1976. However the determination of the set of all possible roots of the sets of 2D polynomials, the next step is to determine the direction cosines from equations (9) and (10), as represented by block 516 of FIG. 5.

$$T_x^{(k)} = \frac{\lambda}{2\pi d_x} \tan^{-1}\left(\frac{\mathfrak{F}(Z_k)}{\mathfrak{R}(Z_k)}\right) \qquad 9$$

$$T_y^{(k)} = \frac{\lambda}{2\pi d_y} \tan^{-1}\left(\frac{\mathfrak{F}(W_k)}{\mathfrak{R}(W_k)}\right) \qquad 10$$

where:

$\mathfrak{R}$ represents an imaginary term, and $\mathfrak{F}$ represents a real term.

From the direction cosines, the elevation and azimuth angles of the jammers are determined by equations (11) and (12), as suggested by block 518 of FIG. 5.

$$E_l^{(k)} = \sin^{-1}(T_y^{(k)}) \qquad 11$$

$$A_z^{(k)} = \cos^{-1}\left(\frac{T_x^{(k)}}{\sin(E_l^k)}\right), k = 1, 2, \ldots, K \qquad 12$$

Once the jammer directions have been determined in block 518, the information can be sent to a utilization apparatus, such as the display 30 of FIG. 1.

Figure 6:
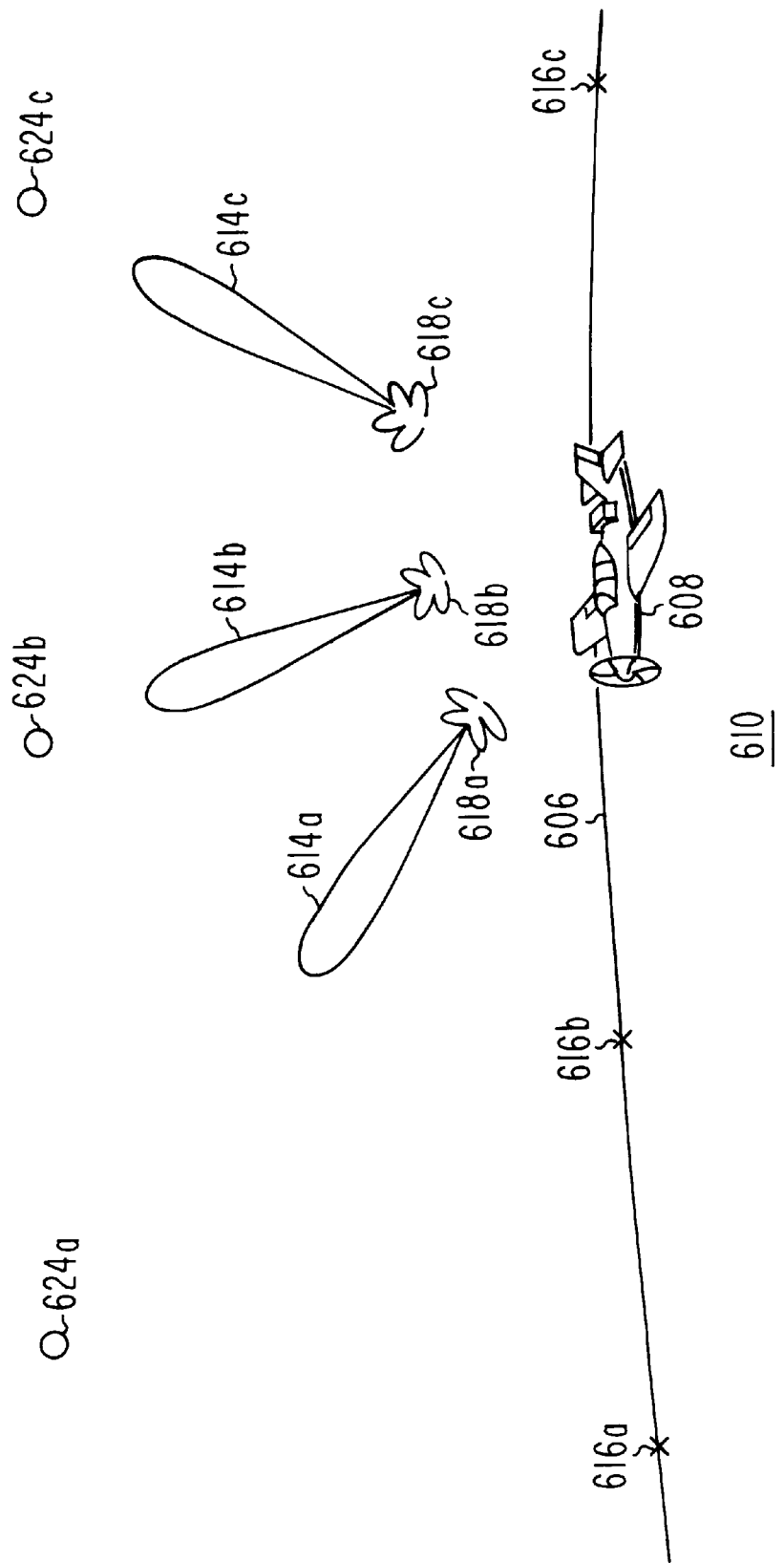
FIG. 6 is a simplified block diagram, of a global positioning receiver system according to an aspect of the invention.

FIG. 6 is a simplified illustration of an aircraft carrying a global positioning system (GPS) receiver. The receiver includes an array antenna which directs a plurality of beams associated with a plurality of antenna beam distributions, one toward each of a plurality of GPS spacecraft. While the number of spacecraft is illustrated as only three, those skilled in the art know that as many as ten such spacecraft may be accessed at a given time for giving an indication of the location of the receiver. In FIG. 6, elements at least somewhat corresponding to those of FIG. 1 are designated by like reference numerals in the 600 series. In FIG. 6, a global positioning system designated generally as 610 includes a plurality of GPS satellites 624a, 624b, and 624c, which broadcast GPS signals in known fashion. An airplane 608 carrying a GPS receiver 698 flies above terrain identified by a horizon 606. A plurality of jammers are indicated by Xs designated 616a, 616b, and 616c. As mentioned above, standoff jammers of necessity appear essentially on the horizon. GPS receiver box 698 generates antenna distributions designated as 614a, 614b, and 614c, which are made to track the spacecraft 624a, 624b, and 624c.

Figure 7:
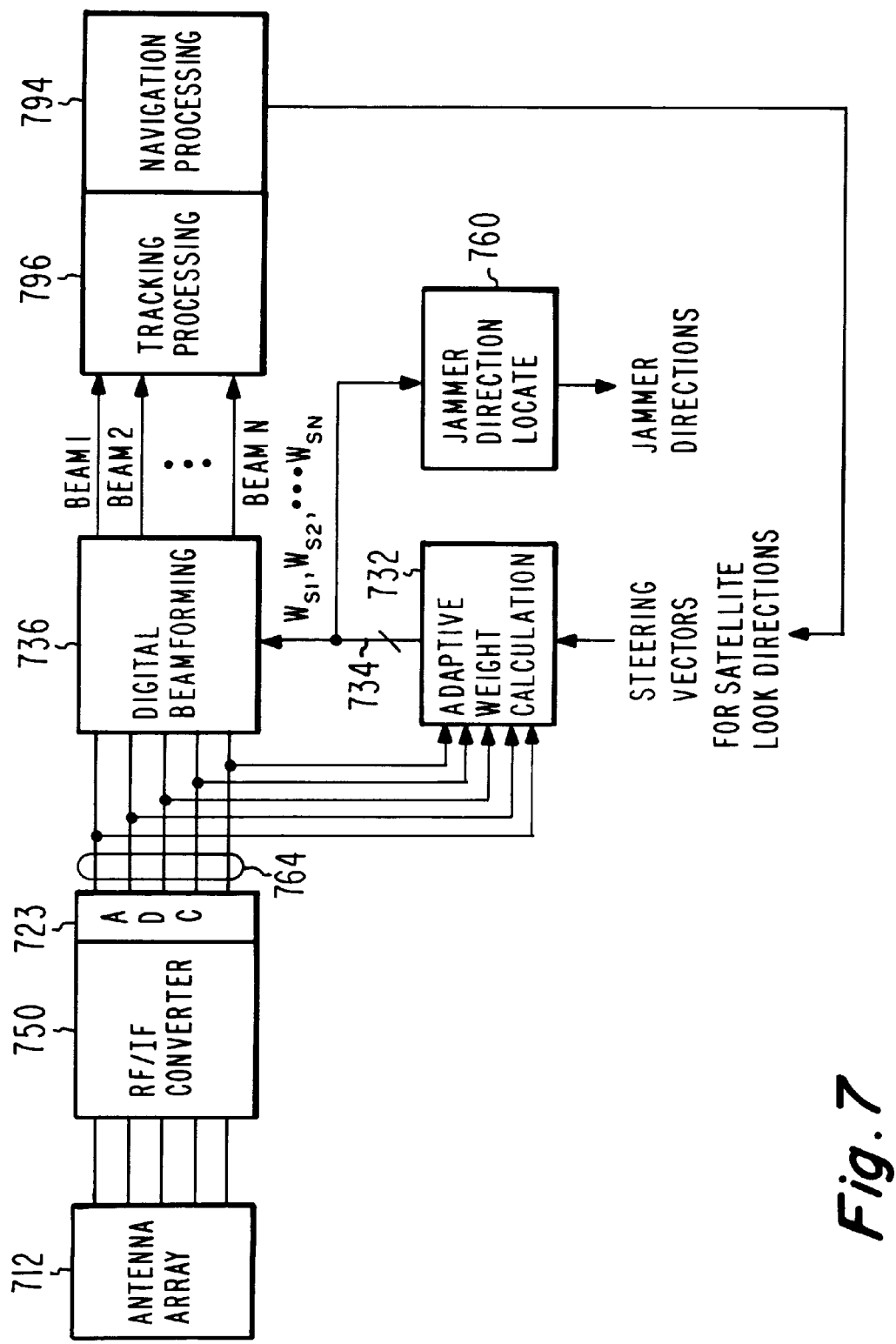
FIG. 7 is a simplified block diagram, similar to FIG. 3, of a portion of the system of FIG. 6.

FIG. 7 is a simplified block diagram of GPS receiver box 698 of FIG. 6. FIG. 7 is generally similar to FIG. 3, and elements corresponding, at least to some degree, with elements of FIG. 3, are designated by the same reference numerals, but in the 700 series. More specifically, In FIG. 7, antenna array 712 is coupled to an RF/IF and downconverter arrangement 750, and an ADC 723 converts the downconverted analog signals for converting them into digital form. The digital signals are applied by way of a signal path 764 to a digital beamformer 736, which processes the signals to produce the desired beams, designated beam 1, beam 2, beam 3, . . . beam N. The signals representing the various beams are applied to a tracking processor 796 and to a navigation processor 794. Tracking processor 796 processes or tracks the received satellite signals, and finds plural pseudo-ranges. Navigation processor 694 uses the pseudo-ranges to identify the location of the GPS receiver.

Also in FIG. 7, adaptive weight calculation arrangement 732 receives the downconverted digital signals, and processes them to produce weight sets $W_{S1}, W_{S2}, W_{S3}, \ldots W_{SN}$ for application by way of a data path 334 to the digital beamforming processor 736, as in the arrangement of FIG. 3. According to an aspect of the invention, a jammer direction or location block 760 is coupled by a branch of path 734 to receive the weight sets $W_{S1}, W_{S1}, W_{S3}, \ldots W_{SN}$, for determining the directions of the jammers, and for generating information for application to a utilization device (not illustrated) or a display (not separately illustrated).

In operation of the arrangement of FIG. 7, calculations are performed which correspond to those performed in blocks 332A, 332B, 510, 512, 514, 516, and 518. There is no essential difference in the processing required to determine the jammer directions in the arrangement of FIGS. 6 and 7 and that required for the radar system of FIGS. 1, 3, 4, AND 5.

Figure 8:
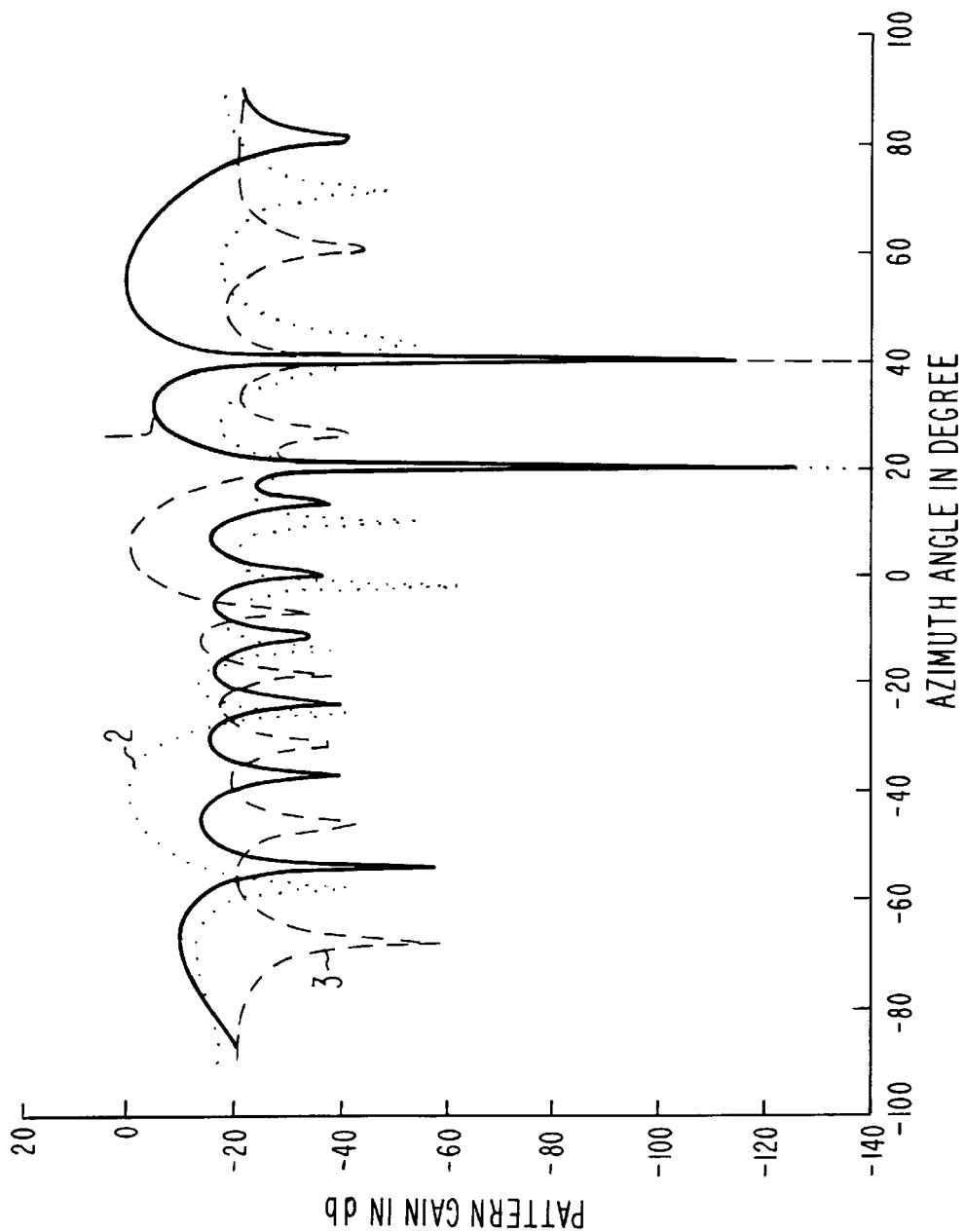
FIG. 8 illustrates a series of plots showing a common null.

FIG. 8 is a computer simulation which illustrates three superposed 2-D antenna plots, representing a system using autonomous nulling arrangements to generate nulls in three directive patterns under the influence of jammers. Solid-line pattern 1, dotted-line pattern 2, and dash-line pattern 3 all show nulls at azimuth angles of +20° and +40°, thereby indicating the jammer directions or locations in azimuth.

Thus, an arrangement according to an aspect of the invention allows determination of the direction of one or more jammers when the receiving system includes an array antenna capable of forming multiple beams either simultaneously or in succession, and when the receiving system includes autonomous or automatic nulling arrangements for generating nulls in the antenna directional patterns at (or in) the angular direction of the jammer(s). The jammer direction determination is made without additional hardware, and requires only further processing of the signals already generated by the receiving system.

Other embodiments of the invention will be apparent to those skilled in the art. While the invention has been described in radar and GPS receiver contexts, the invention may be used in other systems having similar characteristics. More particularly, while the described radar system uses the same antenna for both transmission and reception, those skilled in the art know that different antennas can be used for transmission and reception. The illustrated array antennas are rectangular, but circular, elliptical, polygonal, and possibly irregularly-shaped arrays may be used. The antenna apertures may be filled or thinned, and the antenna elements may be linearly, circularly, or elliptically polarized. The radar system may transmit continuous-wave or pulsed signals, which may be chirped or frequency-stepped, all as known in the art. While the utilization apparatus has been illustrated and described as a display, the information could be sent directly to a missile for targeting the jammer, without separate display of the information. While the radar system has been described as performing target detection and location, it should be understood that in some situations the radar may determine only range to the target, rather than actual location; the radar may also perform other functions, such as target identification (determination of the nature of the target as missile or aircraft type).

Thus, a radar system (10) according to an aspect of the invention includes at least one array antenna (12), for generating multiple directive beam patterns (14a, 14b, 14c). These multiple directive beam patterns (14a, 14b, 14c) may be generated simultaneously, or they may be generated sequentially, so long as generated during an interval in which a jammer (16a, 16b, 16c) signal is present at a fixed location, which is to say in a direction relative to the radar which remains fixed for a relevant period of time. To put it another way, it doesn't matter if the beam patterns or beams (14a, 14b, 14c) are formed simultaneously or sequentially, so long as the jammer (16a, 16b, 16c) doesn't become inactive (turn OFF) or move its location between beams (14a, 14b, 14c). Each of the directive beam patterns (14a, 14b, 14c) is associated with a plurality of sidelobe (18a, 18b, 18c, . . . nulls N, as is well known to those skilled in the art. The radar system includes a transmitting (20) arrangement, and a receiving (22) arrangement coupled to the array antenna(s) (12). The transmitting arrangement (20) generates radar transmission signals for transmission toward targets (24a, 24b, 24c), and the receiving arrangement (22) receives reflected signals from targets (24a, 24b, 24c) over (or by way of) at least some of the directive beam patterns (14a, 14b, 14c). The radar system (10) also includes a radar signal processing arrangement (26) coupled to the transmitting and receiving arrangement (22), for processing information relating to the transmission and reflected signals, for generating display information relating to the targets (24a, 24b, 24c), all as known in the radar arts. The radar system also includes a plurality (at least two, and preferably more) of adaptive jammer (16a, 16b, 16c) nulling arrangements (32a, 32b, 32c, . . . coupled to the receiving arrangement (22) and to control the array antenna (12). Each of the jammer (16a, 16b, 16c) nulling arrangements (32a, 32b, 32c, . . . ) adjusts the antenna (12) beam patterns (14a, 14b, 14c, . . . ) of the array antenna (12) in a manner which produces a beam null (250, 252, 254, 256, 258, 260) directed toward the associated jammer (16a, 16b, 16c), for thereby reducing the effect of operation of the jammer (16a, 16b, 16c) on the radar system (10). Since there are a plurality of such jammer (16a, 16b, 16c) nulling arrangements (32a, 32b, 32c, . . . ), there are a plurality of antenna (12) beam pattern nulls (250, 252, 254, 256, 258, 260), at least one directed toward each jammer (16a, 16b, 16c), and these nulls (250, 252, 254, 256, 258, 260) remain in the same direction (at least over the relevant time period) regardless of the direction in which the main beam (14am, 14b, 14cm, . . . ) or beams of the antenna pattern (14a, 14b, 14c, . . . ) is pointed or steered. A jammer (16a, 16b, 16c) direction determination arrangement (40) is coupled to the jammer (16a, 16b, 16c) nulling arrangement, for comparing the directions of the nulls (N and 250, 252, 254, 256, 258, 260) in each of the antenna (12) beams (14a, 14b, 14c), including those nulls produced by each of the jammer (16a, 16b, 16c) nulling arrangements (32a, 32b, 32c, . . . ). The nulls (250, 252, 254, 256, 258, 260) produced by the jammer (16a, 16b, 16c) nulling arrangements (32a, 32b, 32c, . . . ) will occur in the same direction (at the same location) in each beam pattern (14a, 14b, 14c, . . . ), while other antenna (12) beam nulls (N, the sidelobe nulls) will, in general, not occur at the same locations in all of the beam patterns (14a, 14b, 14c, . . . ). The directions in which nulls (250, 252, 254, 256, 258, 260) occur in all of the relevant antenna (12) beam patterns are deemed to be the directions of the jammer(s) (16a, 16b, 16c).

Another embodiment of the invention lies in a global positioning system (GPS) receiver. The GPS receiver includes at least one array antenna (12), for generating antenna (12) beam patterns. As in the case of the radar antenna (12) system, the beam patterns may be simultaneous or sequential, so long as the sequential beams (14a, 14b, 14c) include multiple directive beams (14a, 14b, 14c) during an interval in which a jammer (16a, 16b, 16c) signal is present at a fixed location. Each of the directive beams (14a, 14b, 14c) is associated with sidelobe nulls (250, 252, 254, 256, 258, 260) (18a, 18b, 18c, . . . ). The GPS receiver includes a receiving and control arrangement coupled to the (at least one) array antenna (12), for directing the beams (14a, 14b, 14c) toward global positioning satellites, and for receiving global positioning signals from the global positioning satellites. A signal processing arrangement (26) is coupled to at least the receiving portion of the receiving and control arrangement, for processing information relating to the global positioning signals, and for generating display information relating to the position of the global positioning receiver, all as known in the art. A plurality of adaptive jammer (16a, 16b, 16c) nulling arrangements (32a, 32b, 32c, . . . ) is coupled to the receiving and control arrangement, for adjusting the antenna (12) beam patterns of the array antenna (12) in a manner which produces a beam null directed toward each jammer (16a, 16b, 16c) in each of the patterns, for thereby reducing the effect of operation of the jammer (16a, 16b, 16c) on the global positioning receiver. The GPS receiver also includes a jammer (16a, 16b, 16c) direction determination arrangement coupled to the jammer (16a, 16b, 16c) nulling arrangements, for comparing the directions of the nulls (250, 252, 254, 256, 258, 260) in each of the antenna (12) patterns, including those nulls (250, 252, 254, 256, 258, 260) produced by the jammer (16a, 16b, 16c) nulling arrangements (32a, 32b, 32c, . . . ). Those directions in which nulls (250, 252, 254, 256, 258, 260) occur in all of the antenna (12) patterns are deemed to be the directions of the jammer (16a, 16b, 16c)s. Naturally, while the system as described can determine the directions of multiple jammer (16a, 16b, 16c)s, if only one jammer (16a, 16b, 16c) is present, only one direction will be identified.

What is claimed is:

1. A radar system, comprising:
at least one array antenna, for generating multiple directive beam patterns during an interval in which jammer signals are present in fixed directions, each of said directive beam patterns being associated with sidelobe nulls;
transmitting means for generating radar transmission signals for transmission toward targets, and receiving means coupled to said at least one array antenna, for receiving reflected signals, over at least some of said directive beams, from at least one of said targets;

radar signal processing means coupled to said transmitting and receiving means, for processing information relating to said transmission and reflected signals, for generating display information relating to said targets;

a plurality of adaptive jammer nulling arrangements coupled to said receiving means and to control said array antenna, for adjusting said antenna beam patterns of said array antenna in a manner which produces a beam null directed toward each said jammer, for thereby reducing the effect of operation of said jammer on said radar system; and jammer direction determination means coupled to said jammer nulling arrangements, for comparing the directions of said nulls produced by each of said jammer nulling arrangements, and for deeming those directions in which nulls occur in all of said directive antenna patterns to be the directions of said jammers.

2. A method for detecting the locations of targets and the directions of jammers, said method comprising the steps of:

transmitting radar transmission signals toward a target;

with a controllable array antenna, receiving reflected signals from said target;

controlling the directive pattern of said controllable array antenna in such a manner as to generate at least one main lobe for each of a plurality of independently directed directive patterns;

processing said received signals to identify a target and determine its location;

in the presence of jamming signals, processing said received signals in such a manner as to produce signals for modifying said plurality of directive patterns to direct a directivity null of each of said directivity patterns toward the source of said jamming signals; and comparing a plurality of said directivity patterns with each other, and deeming the direction of a source of said jamming signals to be in that direction in which a null occurs for all of said plurality of directivity patterns.

3. A global positioning receiver, comprising:

at least one array antenna, for generating antenna beam patterns, which beam patterns include multiple directive beams during an interval in which a jammer signal is present at a fixed location, each of said directive beams being associated with sidelobe nulls;

receiving and control means coupled to said at least one array antenna, for directing said directive beams toward global positioning satellites, and for receiving global positioning signals from said global positioning satellites;

processing means coupled to at least said receiving means, for processing information relating to said global positioning signals, for generating display information relating to the position of said global positioning receiver;

a plurality of adaptive jammer nulling arrangements coupled to said receiving and control means, for adjusting the antenna beam patterns of said array antenna in a manner which produces a beam null directed toward each jammer, for thereby reducing the effect of operation of the jammer on said global positioning receiver; and jammer direction determination means coupled to said jammer nulling arrangements, for comparing the directions of said nulls produced by each of said jammer nulling arrangements, and for deeming those directions in which nulls occur in all of said jammner nulling arrangements to be the directions of said jammers.

\* \* \* \* \*